United States Patent Office 3,013,992
Patented Dec. 19, 1961

3,013,992
ORDERED ORGANO SILICON-TITANIUM OXIDE COPOLYMERS
John B. Rust and Hideyo H. Takimoto, Los Angeles, Calif., assignors to Hughes Aircraft Company, Culver City, Calif., a corporation of Delaware
No Drawing. Filed June 30, 1959, Ser. No. 823,817
14 Claims. (Cl. 260—2)

The present invention relates to copolymers containing an ordered arrangement of silicon and titanium atoms, especially silicon-titanium oxide copolymers containing regularly ordered repeating units along the polymer chain, and the method of making such copolymers.

Copolymers of titanium oxide and silicones have been described in the prior art. These copolymers have been produced by processes leading to random entry of the silicone or the titanium oxide into the polymer molecule. Although this has resulted in many cases in products of improved utility, the excellent properties which are inherent in copolymers containing an Si—O—Ti—O repeating unit have not been realized. The prior art copolymers contain the units Si—O—Si—O and Ti—O—Ti—O, as well as the regularly ordered units, but in such known copolymers the occurrence of these units is random and unpredictable.

Furthermore, prior disclosures have been concerned with copolymers of silicone with titanium oxide produced by condensing soluble titanium derivatives, such as titanium esters and mixed ester acylates with a silicone by reaction with a pre-formed silicone resin, or by cohydrolyzing these derivatives with a hydrolyzable organo-substituted silane. The result has been that either highly cross-linked products were formed or a composition obtained which still contained readily hydrolyzable groups attached to titanium atoms. It is not possible to produce thermally stable linear copolymers, or linear copolymers that are stable to chemical degradation, by such methods of the prior art. Furthermore, control of the copolymerization reactions by prior art methods often is exceedingly difficult or impossible. In many cases prior art methods require the incorporation of only very small percentages of titanium oxide in the copolymer. This being the case, it is immediately obvious that only very small quantities of Ti—O—Si—O repeating units could be present in the copolymer even if it were possible to produce such units by prior art methods. We have now discovered that it is possible to produce copolymers containing such regularly repeating units and that these new copolymers possess many unique properties not present in the randomly copolymerized materials of the prior art.

Accordingly, it is an important object of this invention to provide resinous compositions possessing improved thermal stability and chemical resistance to solvent and corrosive degradation.

Another object of this invention is to provide copolymers containing silicon-titanium oxide units in a regularly repeating orientation in the copolymer molecules.

A further object of this invention is to provide a method for producing polymers containing regularly repeating Ti—O—Si—O units in the polymer molecule.

The process of producing the copolymers of the present invention may be graphically illustrated by the following reaction:

R₂Si(OOCR′)₂+(R″₃SiO)₂Ti(OR‴)₂ ⟶

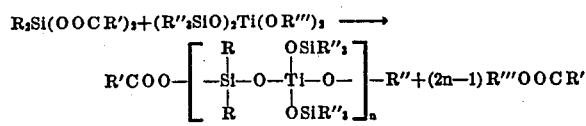

We have found that this reaction, which has several variations that will become apparent from the more detailed description given hereinafter, will produce substantially regularly ordered silicon-titanium copolymers. Thus when conducted properly, as will be described in the illustrative examples given hereinafter, a polymer chain containing regularly ordered repeating units of Si—O—Ti—O will be produced. Under the reaction conditions used, R₂Si(OOCR′)₂ does not react with similar molecules to yield Si—O—Si—O units, and (R″₃SiO)₂Ti(OR‴)₂ does not substantially react with similar molecules to introduce Ti—O—Ti—O units into the copolymer.

The variations of the above reaction in general fall into two classes: (1) chain limiting reactions, and (2) cross-linking reactions. These two classes may be graphically illustrated by the following typical reactions:

(1) Chain limiting reactions:

(a)

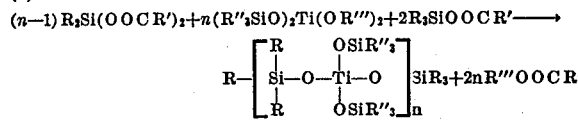

(b)

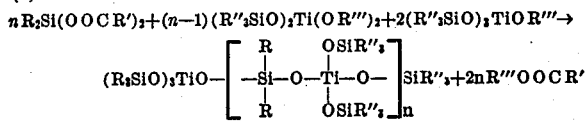

(2) Cross-linking reactions:

(a)

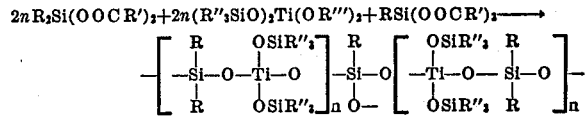

(b)

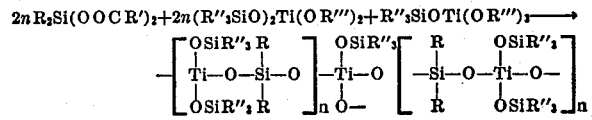

The copolymers of the present invention may be prepared with any desired molecular weight and form depending upon the reaction conditions, stoichiometry, and character of the R and R″ groups employed. In general, the initial polymers of this invention have the form of:

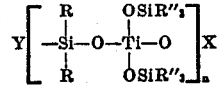

where X may be —OR‴ or

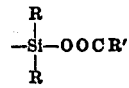

and Y may be

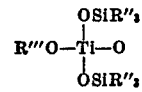

or OOCR′.

This, of course, is true if the chain limiters are used, otherwise the chain ends may be as illustrated in (1). In all of the above reactions, including the basic reaction for preparation of the polymers of this invention, it also is possible to employ the reactants:

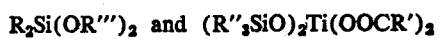

in which event X and Y of the above formulation would be

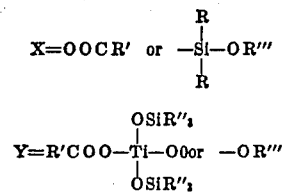

$$X = OOCR' \text{ or } -\underset{R}{\overset{R}{Si}}-OR'''$$

$$Y = R'COO-\underset{OSiR''_3}{\overset{OSiR''_3}{Ti}}-OO \text{ or } -OR'''$$

In order to produce the polymers of the present invention, it is preferable that the intermediates be synthesized in a substantially pure form. The silane derivatives may be made and purified by any suitable means well-known to those skilled in the art. The triorganosubstituted siloxy titanium derivatives, we have found, preferably are prepared according to the following reactions:

I. $xR''_3SiOOCR' + Ti(OR''')_4 \dashrightarrow$
$(R''_3SiO)_xTi(OR''')_{4-x} + XR'''OOCR'$
II. $xR''_3SiOH + Ti(OR''')_4 \dashrightarrow$
$(R''_3SiO)_xTi(OR''')_{4-x} + XR'''OOCR'$ where $x=1, 2, 3$. Reaction II is only applicable where stable hydroxy silanes are available.

In all of the above reactions R and R'' may be any suitable alkyl, aralkyl, aryl, or alkaryl radical, such as methyl, ethyl, propyl, butyl, isopropyl, sec. butyl, octyl, stearyl, and the like, or benzyl, methyl benzyl, α-phenyl ethyl, β-phenyl ethyl, α-phenyl propyl, etc., or phenyl, naphthyl, diphenyl, tolyl, xylyl, and the like, or mixed radicals. R' and R''' may be an alkyl, aralkyl, aryl or alkaryl radical. However, these groups are preferably of low molecular weight so that the by-product ester which is eliminated during the reaction is sufficiently volatile to be removed from the copolymer by distillation at ambient or reduced pressure. The preferred, lower molecular weight groups may be methyl, ethyl, propyl, butyl, benzyl, phenyl, and the like.

The polymers of the present invention may be polymerized further by hydrolysis of the end groups X and Y of the polymers illustrated above. This polymerization which results from hydrolysis and results in an increase in molecular weight may introduce some discontinuities into the resulting ordered polymer chain by introducing some Ti—O—Ti and Si—O—Si units. However, the concentration or density of these discontinuities in the regularity of the polymer chains is so small that no noticeable effect is produced by their presence. This is illustrated by:

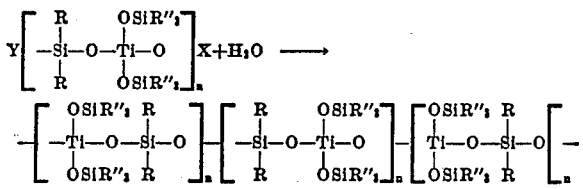

The copolymers of this invention are unique in that they exhibit enhanced properties of thermal stability and chemical resistance to solvent and corrosive degradation. These copolymers can be used as molding, laminating, and casting resins and as protective coatings, adhesives and insulating varnishes. The polymers may be used alone, or in admixture with fillers and reinforcing agents, the proper choice of which depends upon the end use of the composition. As fillers there may be used glass fibers, clays, pigments—such as iron oxide, zinc oxide, litharge, titanium dioxide, etc. Although the compositions of this invention may be advanced or cured by the application of heat, catalysts may be employed, such as metallic salts of carboxylic acids, quaternary ammonium salts of carboxylic acids, metallic oxides, amines, organic peroxides, and the like.

The products of this invention which contain reactive end groups may be used to great advantage to prepare modifications of a variety of resinous materials of enhanced thermal properties, mechanical strength at elevated temperatures, weathering resistance and the like. The reactive end groups of our polymers are capable of reacting with alcohol and acid groups on resinous products such as alkyd resins, with phenolic hydroxyl groups, with esters by interchange, with drying oil fatty acids, with silicone hydroxyl groups, with amine groups, and epoxy groups as well as many other reactive sites on other polymer molecules. By reacting with these resinous compositions, the polymers of this invention become a chemical part of the resinous composition and thus impart desirable and unique properties to these modified compositions.

The following examples are given to illustrate the polymers and compositions of this invention, the process of making them, the intermediates from which the polymers are made, and the uses of the polymers. These examples are not to be construed as limiting the scope of this invention in any manner.

*Example I*

To 68.8 grams of bis-(trimethylsiloxy) diisopropoxytitanium was added 14.5 grams of methyltriacetoxysilane. An exothermic reaction occurred during the addition of the acetoxysilane. A white gel was formed in the reaction mixture and refluxing of a colorless liquid was observed. The condensation product, isopropyl acetate, was removed by distillation leaving a brittle white polymer of very high softening temperature and excellent thermal stability. The polymer was insoluble in a large variety of solvents and appeared to be highly cross-linked.

*Example II*

An equimolar quantity of dimethyldiacetoxysilane was slowly added to bis-(trimethylsiloxy) diisopropoxytitanium. An evolution of considerable amount of heat was observed. The reaction mixture remained clear and water white even after the addition of the acetoxysilane. After stirring at room temperature for one hour, the reaction mixture was heated to distill off isopropyl acetate. Last traces of the ester were removed by heating the contents of the flask above 200° C. The product remaining in the flask was an amber-colored, viscous polymer soluble in toluene. A glassy, amber solid was obtained upon continued heating of this material. This polymer was substantially linear since it showed considerable solubility in dimethylformamide. It could be cast into a film which became insoluble and infusible upon prolonged heating at elevated temperatures.

*Example III*

Dimethyldiacetoxysilane (26.4 grams) was added slowly to 31.4 grams of trimethylsiloxy triisopropoxytitanium in 75 ml. of toluene. After the exothermic reaction had subsided, the stirring was continued for two hours. The reaction mixture became cloudy and a white precipitate was formed. The condensation product and the solvent toluene were removed by distillation. A white powdery polymer remained as a residue in the reaction flask. This polymer was also highly cross-linked, as was that of Example I. The polymer possessed excellent thermal stability and was insoluble in all the common solvents.

*Example IV*

A mixture of 15.8 grams of dimethyldiacetoxysilane and 1.32 grams of trimethylacetoxysilane was added slowly to 34.4 grams of bis-(trimethylsiloxy)-diisopropoxytitanium. The heat of the reaction caused the temperature of the reaction mixture to rise. The clear solution was stirred for two hours and the volatile material was removed by distillation. A viscous yellow oil which did not increase in viscosity appreciably upon further heating was obtained. Heating for prolonged periods in the absence of air effected very little change in the appearance of the oil. Upon casting into a film and heating above 200° C. for a long period of time, further cure was obtained and a tough resinous coating was secured.

*Example V*

Bis-(trimethylsiloxy)diisopropoxytitanium (37.4 grams) and dimethyldiacetoxysilane (17.6 grams) were mixed in a reaction apparatus. A solution of sodium ethylate prepared from 0.5 gram of sodium and 10 cc. of ethyl alcohol was then added. After the exothermic reaction has subsided, the pale yellow solution was stirred and heated for several hours. The volatile material was removed first by distillation at atmospheric pressure and then under reduced pressure. The resulting cream-colored product was only partially soluble in toluene. It possessed excellent thermal stability when heated in an inert atmosphere. In the presence of oxygen and in film form prolonged heating at elevated temperature caused further curing to occur.

What is claimed is:

1. A process for the production of an ordered organosiloxy titanium oxide polymer comprising reacting, by organic ester elimination under substantially anhydrous conditions, an organo acyloxy silane having the general formula $R_nSi(OOCR')_{4-n}$ with a triorganosiloxy alkoxy titanium compound having the general formula $(R''_3SiO)_m Ti(OR''')_{4-m}$, wherein R and R'' are hydrocarbon radicals selected from the class consisting of alkyl, aryl, aralkyl and alkaryl, wherein R' and R''' are hydrocarbon alkyl radicals and m and n take the integral values of 1 or 2.

2. A process for the production of an ordered organosiloxy titanium oxide polymer comprising reacting, by organic ester elimination under substantially anhydrous conditions, an alkyl acyloxy silane having the general formula $R_nSi(OOCR')_{4-n}$, with a trialkylsiloxy alkoxy titanium compound having the general formula $(R''_3SiO)_m Ti(OR''')_{4-m}$, wherein R and R'' are hydrocarbon alkyl radicals selected from the group consisting of methyl, ethyl, propyl, butyl, amyl, and hexyl, wherein R' and R''' are hydrocarbon alkyl radicals and m and n take the integral values of 1 or 2.

3. A process for the production of an ordered organosiloxy titanium oxide polymer comprising reacting, by organic ester elimination under substantially anhydrous conditions, an aryl acyloxy silane having the general formula $RnSi(OOCR')_{4-n}$ with a triarylsiloxy alkoxy titanium compound having the general formula $(R_3''SiO)_m Ti(OR''')_{4-m}$, wherein R and R'' are hydrocarbon aryl radicals selected from the group consisting of phenyl, tolyl, xylyl, biphenylyl, and naphthyl, wherein R' and R''' are hydrocarbon alkyl radicals, and m and n take the integral values of 1 or 2.

4. A process according to claim 1 wherein R is a hydrocarbon aryl radical and R'' is a hydrocarbon aryl radical.

5. A process according to claim 1 wherein R is a hydrocarbon aryl radical and R'' is a hydrocarbon alkyl radical.

6. A process according to claim 1 where R is a hydrocarbon aryl radical and R'' is a hydrocarbon aralkyl radical.

7. A process according to claim 1 wherein R is a hydrocarbon alkyl radical and R'' is a hydrocarbon aralkyl radical.

8. A process according to claim 1 wherein R is a hydrocarbon alkaryl radical and R'' is a hydrocarbon alkyl radical.

9. A process according to claim 1 wherein R is a hydrocarbon aralkyl radical and R'' is a hydrocarbon alkyl radical.

10. A process for the production of an ordered organosiloxy titanium oxide polymer comprising reacting, by organic ester elimination under substantially anhydrous conditions, dimethyl diacetoxy silane with bis(trimethyl siloxy)diisopropoxy titanium.

11. A process for the production of an ordered organosiloxy titanium oxide polymer comprising reacting, by organic ester elimination under substantially anhydrous conditions, methyl triacetoxy silane with bis(trimethylsiloxy) diisopropoxy titanium.

12. A process for the production of an ordered organosiloxy titanium oxide polymer comprising reacting, by organic ester elimination under substantially anhydrous conditions, dimethyl diacetoxy silane with trimethylsiloxy triisopropoxy titanium.

13. A process for the production of an ordered organosiloxy titanium oxide polymer comprising reacting, by organic ester elimination under substantially anhydrous conditions, a mixture of dimethyl diacetoxy silane and trimethyl acetoxy silane with bis(trimethyl siloxy) diisopropoxy titanium.

14. An ordered organosiloxy titanium oxide polymer comprising the reaction product formed, by organic ester elimination under substantially anhydrous conditions, from an organo acyloxysilane having the general formula $R_nSi(OOCR')_{4-n}$ with a triorganosiloxy alkoxy titanium compound having the general formula $$(R''_3SiO)_m Ti(OR''')_{4-m}$$

wherein R and R'' are hydrocarbon radicals selected from the class consisting of alkyl, aryl, aralkyl and alkaryl, wherein R' and R''' are hydrocarbon alkyl radicals and m and n take the integral values of 1 or 2.

References Cited in the file of this patent

UNITED STATES PATENTS

| | | |
|---|---|---|
| 2,512,058 | Gullidge | June 20, 1950 |
| 2,676,102 | Boyd et al. | Apr. 20, 1954 |
| 2,910,496 | Bailey et al. | Oct. 27, 1959 |

UNITED STATES PATENT OFFICE
CERTIFICATION OF CORRECTION

Patent No. 3,013,992                                December 19, 1961

John B. Rust et al.

It is hereby certified that error appears in the above numbered patent requiring correction and that the said Letters Patent should read as corrected below.

Column 3, lines 8 to 11, the formula should appear as shown below instead of as in the patent:

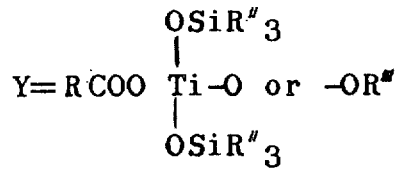

same column 3, lines 57 to 60, extreme right-hand portion of the formula, the last opening bracket should appear as a closing bracket.

Signed and sealed this 5th day of June 1962.

(SEAL)
Attest:

ERNEST W. SWIDER                                DAVID L. LADD

Attesting Officer                                    Commissioner of Patents